W. W. ANDERSON.
THILL-COUPLING.
No. 174,930. Patented March 21, 1876.
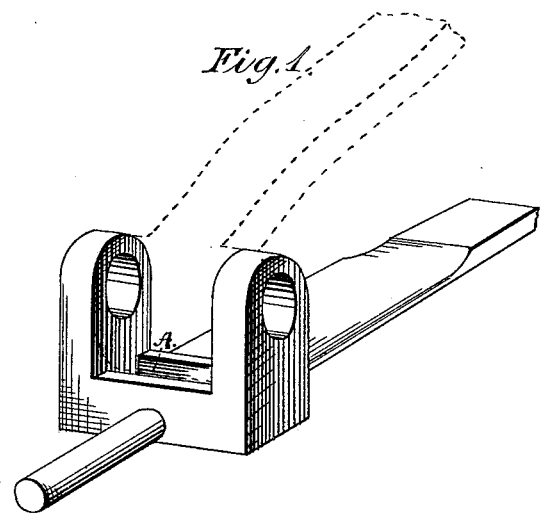
Fig. 1.
Fig. 2.

UNITED STATES PATENT OFFICE.

WILLIAM W. ANDERSON, OF PHILADELPHIA, PENNSYLVANIA.

IMPROVEMENT IN THILL-COUPLINGS.

Specification forming part of Letters Patent No. 174,930, dated March 21, 1876; application filed August 7, 1875.

*To all whom it may concern:*

Be it known that I, WM. W. ANDERSON, of Philadelphia, State of Pennsylvania, have invented an Improvement in Thill-Coupling, of which the following is a specification:

The object of my invention is to make an improvement in thill-coupling to prevent rattling, and to take the place of gum that has heretofore been used, by constructing in the ordinary thill-box now in general use a receptacle, A, and spring B, the combination of which will produce steady and regular pressure upon the thill when coupled, and thus accomplish the aforesaid purpose, as shown in Figures 1 and 2 of the accompanying drawings. The spring B may be made of any metal having sufficient strength and elasticity, and made in various forms, though composed of steel, and made in the form as shown in Fig. 2, is preferable.

The prevention of the rapid wear and consequent rattling of thill-couplings has long been a desideratum which the gum plug has only partially and temporarily supplied, from a lack of regular elasticity, which at first is so great as to cause cutting of the thill-eye and bolt, and after a few months' wear is so diminished as to cause the gum to become loose and ineffective, whereas the pressure made by the metallic or steel spring is so constant and regular as to prevent the cutting of the bolt, or scarcely any perceptible wear, even by long and continued use.

I claim as my invention—

A thill-coupling clip with a transverse bar, provided with a cavity, A, combined with a metallic spring, B, seated in said cavity, and bearing directly against the ordinary shaft-iron, substantially as shown and described.

WM. W. ANDERSON.

Witnesses:
 N. R. LYNCH,
 S. P. HOLLINGSWORTH.